No. 786,372. PATENTED APR. 4, 1905.
A. A. MILLER.
NUT LOCK.
APPLICATION FILED AUG. 1, 1904.
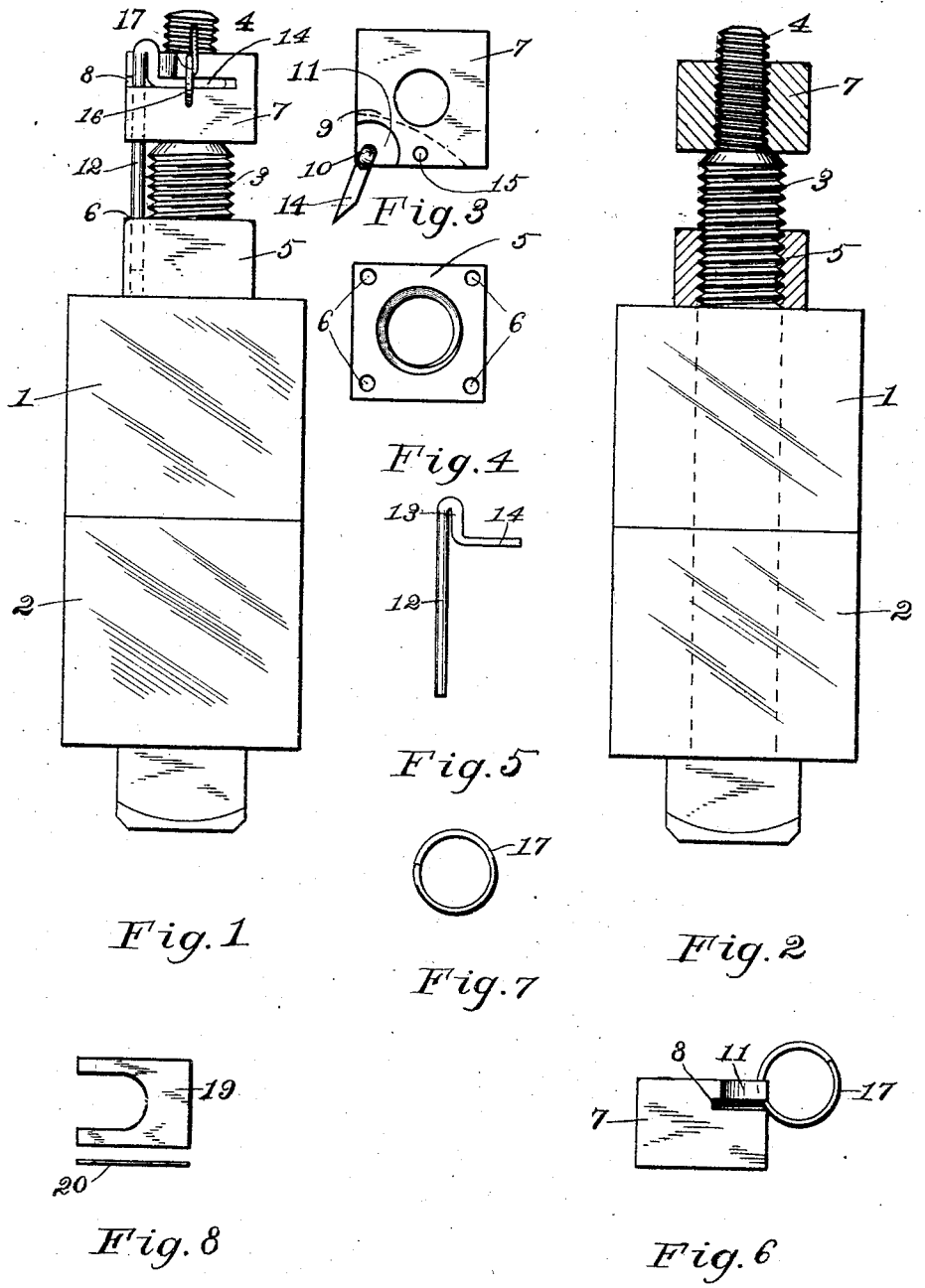
WITNESSES:
R E Hamilton
M. L. Lange
INVENTOR,
Aurelia A. Miller.
By Higdon & Higdon
Att'ys.

No. 786,372.

Patented April 4, 1905.

UNITED STATES PATENT OFFICE.

AURELIA A. MILLER, OF KANSAS CITY, MISSOURI.

NUT-LOCK.

SPECIFICATION forming part of Letters Patent No. 786,372, dated April 4, 1905.

Application filed August 1, 1904. Serial No. 218,996.

*To all whom it may concern:*

Be it known that I, AURELIA A. MILLER, a citizen of the United States, residing at Kansas City, in the county of Jackson and State of Missouri, have invented new and useful Improvements in Nut-Locks, of which the following is a specification.

My invention relates to nut-locks; and the object of my invention is to provide a reliable means to prevent the nut from working loose on the end of a bolt after it has been screwed down fast on the objects to be bolted together.

Reference is now had to the accompanying drawings, in which—

Figure 1 is a plan view of two blocks of wood with a bolt passing through them and two nuts in position on the screw-threaded end of the bolt, as shown. Fig. 2 is a view of the same with the two nuts referred to in Fig. 1 in section. Fig. 3 is a top plan view of the upper nut seen in Fig. 1 and in section at Fig. 2, disclosing the upper end of a locking-key which will be fully described. Fig. 4 is a top plan view of the lower nut seen in Figs. 1 and 2. Fig. 5 illustrates a locking-key, the same as seen in position at Fig. 1. Fig. 6 is a side view of the outer nut, disclosing the position of the lap-ring. Fig. 7 is a detail plan view of the lap-ring. Fig. 8 is a face and edge view of a washer which will be fully described.

I will now further proceed to describe my invention by referring to corresponding numerals on the drawings and specification, in which—

1 and 2 represent two blocks of wood with a bolt passing through them, one end screw-threaded at 3. Said bolt is provided with a diminished screw-threaded extension 4. Screwed down upon the bolt and resting on the block 1 is an internally-screw-threaded nut 5. Said nut is provided with four holes 6, one in each corner, as shown in Fig. 4. The extension 4 is externally screw-threaded, but in the opposite direction from the screw-threads indicated at 3, making right and left portions. Resting on the shoulder formed between the upper end of the bolt proper and the extension 4 is an internally-screw-threaded nut 7. Said nut is provided with a recess 8 between the upper end face and the middle of the nut. The dimensions of the recess in depth are indicated in a dotted curved line 9 seen at Fig. 3. Said nut 7 is also provided with a vertical opening or hole 10 in one of the corners and is further provided with a curved depression 11, taken out of the corner above the recess 8, as shown. The object of the hole 10 is to admit of a locking-key 12 passing downward through the nut 7 and entering one of the holes 6 in nut 5. Said locking-key 12 is constructed in the configuration seen at Fig. 5 with a loop 13 at its upper end. The lower end 14 of said loop is bent outward at right angles, as shown. The locking-key 12 is adapted to pass loosely through the hole 10 in nut 7 and enter loosely one of the holes 6 in nut 5. When placed in a locking position, the right-angle extension 14 of the locking-key 12 is adapted to swingingly enter the recess 8 in nut 7, and in order to securely hold the said locking-key in this position I have provided an opening or hole 15 through the upper edge of the upper face of the nut 7, which slants outward and passes through a slight depression 16 made in the nut 7 at the lower edge of the recess 8. To engage this hole 15 and the depression 16, I have provided a lap-key-retaining ring 17. This ring is adapted to be inserted through the opening 15 in the periphery thereof, resting on the depression 16, as seen at Fig. 1 and more clearly shown in position at Fig. 6.

In practice, to make my invention of perfect utility, when the nut 5 is screwed down tightly and the nut 7 is screwed down on the shoulder 8, formed between the extension and the screw-threaded end 3 of the bolt, the hole 10 through said nut 7 must stand directly over one of the holes 6 in the nut 5 and at the same time said nut 7 must rest firmly on said shoulder. When in this position, the key 12 is inserted through the hole 10 of nut 7 and enters one of the holes 6 in nut 5; but it may occur after nut 5 is forced down to its proper position in bringing nut 7 down to its position so that the hole in each will register. Said nut 7 may settle firmly on the shoulder before the hole 10 will register one of the holes 6. In this event nut 7 must be turned backward until the hole 10 stands directly over one of the holes 6 in nut 5. This movement would necessarily raise nut 7 slightly from said shoulder upon which it is designed to rest; but to obviate this difficulty I have provided a thin bifurcated tension-washer 19. (Seen at Fig. 8.) The thickness of said washer is indicated at 20 in said figure, so that in the event that nut 7 should stand slightly above the shoulder before key 12 is inserted washer 19 is inserted between nut 7 and the said shoulder, which will take up the slack referred to and make each nut correspondingly tight, so that it will be impossible for nut 5 to become loose or slack, as any backward movement would tend to tighten nut 7, as the threads are right and left. The key 12 may be made any length desired to conform to the distance between the lower nut 5 and the upper 7.

Having now fully described my invention, what I claim as new, and desire to secure by Letters Patent of the United States, is—

1. A nut-lock comprising, in combination, a bolt having its end reduced in diameter and screw-threaded, and having its larger portion adjacent thereto threaded in the opposite direction; an inner nut screwed on said larger threaded portion, said inner nut having a plurality of perforations 6 adapted to receive a locking-key; an outer nut having a recess 11 cut in one corner thereof, and also having a groove 8 communicating with said recess, and also having a perforation which is adapted to register with any one of the perforations of said inner nut; a locking-key, passing through said perforation of the outer nut and entering one perforation of the inner nut, said key having a lateral projection or finger which is adapted to enter said groove 8; and a lap-ring which is adapted to be passed through an opening in the outer nut and be held in such a position as to prevent disarrangement of said locking-key; substantially as described.

2. A nut-lock comprising, in combination, a bolt having its end reduced in diameter and screw-threaded, and having its larger portion adjacent thereto threaded in the opposite direction; an inner nut screwed on said larger threaded portion, said inner nut having a plurality of perforations 6 adapted to receive a locking-key; an outer nut having a recess 11 cut in one corner thereof, and also having a groove 8 communicating with said recess, and also having a perforation which is adapted to register with any one of the perforations of said inner nut; a locking-key, passing through said perforation of the outer nut and entering one perforation of the inner nut, said key having a lateral projection or finger which is adapted to enter said groove 8; a lap-ring which is adapted to be passed through an opening in the outer nut and be held in such a position as to prevent disarrangement of said locking-key; and a bifurcated washer adapted to be inserted between the outer nut and the shoulder formed by the larger threaded portion of the bolt; substantially as described.

In testimony whereof I affix my signature in the presence of two witnesses.

AURELIA A. MILLER.

Witnesses:
  M. L. LANGE,
  JAMES F. YEAGER.